(12) United States Patent  
Su

(10) Patent No.: US 6,695,455 B1  
(45) Date of Patent: Feb. 24, 2004

(54) FABRICATION OF MICROMIRRORS ON SILICON SUBSTRATE

(75) Inventor: Jung-Chieh Su, Hsin-Chu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/116,024

(22) Filed: Jul. 15, 1998

(30) Foreign Application Priority Data

Dec. 31, 1997 (TW) .......................................... 86120052

(51) Int. Cl.[7] ................................................. G02B 5/08
(52) U.S. Cl. ........................ 359/871; 359/883; 359/900; 359/850; 216/24; 216/38; 216/39; 257/98; 427/162; 438/29; 438/43; 438/761
(58) Field of Search ................................ 359/850, 851, 359/855, 871, 883, 900, 884; 257/98; 438/27, 29, 42, 43, 761; 216/24, 38, 39; 427/162

(56) References Cited

U.S. PATENT DOCUMENTS

| | | | | |
|---|---|---|---|---|
| 3,785,892 A | * | 1/1974 | Terry et al. | |
| 3,990,914 A | * | 11/1976 | Weinstein et al. | |
| 3,996,492 A | * | 12/1976 | McGroddy | |
| 4,293,826 A | * | 10/1981 | Scifres et al. | |
| 4,670,969 A | * | 6/1987 | Yamada et al. | |
| 4,855,102 A | * | 8/1989 | Okada et al. | |
| 4,873,429 A | * | 10/1989 | Kume et al. | |
| 4,990,465 A | * | 2/1991 | Liau et al. | |
| 5,017,263 A | * | 5/1991 | Clark | |
| 5,087,124 A | * | 2/1992 | Smith et al. | |
| 5,293,038 A | | 3/1994 | Kadowaki et al. | |
| 5,479,426 A | * | 12/1995 | Nakanishi et al. | |
| 5,500,910 A | | 3/1996 | Boudreau et al. | |
| 5,565,052 A | * | 10/1996 | Papenburg et al. | |
| 5,786,925 A | * | 7/1998 | Goossen et al. | |
| 5,798,283 A | * | 8/1998 | Montague et al. | |
| 5,828,088 A | * | 10/1998 | Mauk | |
| 5,907,791 A | * | 5/1999 | Cappuzzo et al. | |
| 6,426,968 B1 | * | 7/2002 | Strife et al. | |

* cited by examiner

Primary Examiner—Ricky D. Shafer  
(74) Attorney, Agent, or Firm—Nelson A. Quintero

(57) ABSTRACT

A process for fabricating micro-mirrors on a silicon substrate is disclosed, which can markedly improve the flatness of micro-mirrors, reduce the scattering of incident light, and increase S/N ratio. The fabrication process comprises the steps of: forming micro-planes along a certain direction on a silicon substrate to serve as mirrors; forming a $SiO_2$ layer on the silicon substrate; and melting the $SiO_2$ layer on the micro-planes by a heating process and then crystallizing $SiO_2$ again to form micro-mirrors. Further, instead of coating the $SiO_2$ layer, a metal layer can be used to form a eutectic structure with the silicon substrate. After the micro-mirrors are formed, a layer of Au can be coated thereon to increase the reflectance of the micro-mirrors.

21 Claims, 3 Drawing Sheets

FABRICATION OF MICROMIRRORS ON SILICON SUBSTRATE

BACKGROUND OF THE INVENTION

1. Field of the invention

The present invention relates to a process for fabricating mirrors, and more particularly to a process for fabricating micro-mirrors on a silicon substrate.

2. Description of prior art

Nowadays, silicon-based optical systems or components dominate the development of micro-optics technology and are used indifferent ways, such as optical pick-up head apparatus, laser collimating lens and WDM for fiber-optical communication disclosed, for example, in U.S. Pat. No. 5,500,910.

Referring to FIG. 1, U.S. Pat. No. 5,293,038 has disclosed the structure of an optical pick-up head apparatus, which comprises a laser source 11, a first semiconductor substrate 12, a second semiconductor substrate 13, a holographic optics 14, a photo-detector 15, mirrors 17 and 18, an optical lens 19 and an optical disk 20. In this structure, optical mirrors are fabricated on (100) silicon. 45° optical mirrors 17 are formed by etching the silicon at an angle of 9° from the {110} surface. The mirrors are coated with Au to increase the reflectance. All of the components of an optical pick-up head apparatus are integrated into a single chip to reduce its weight and volume. Therefore by using the prior-art structure the size of the pick-up head apparatus can be precisely controlled, the pick-up device is easy to mass-produce, and the manufacturing cost can be reduced. However, since the optical pick-up head is a micro-optics formed on silicon, the flatness of silicon surface must be controlled within $\lambda/4$. To form micromirrors in a dimension of a few hundred micrometers to several ten micrometers is difficult when using conventional polishing. Accordingly, current research is primarily directed toward discovering how to improve the flatness of micromirror surfaces to reduce the scattering effect on the laser and to raise the S/N ratio.

SUMMARY OF THE INVENTION

An object of the present invention is to provide a fabrication process of micromirrors on a silicon substrate to improve the flatness of micromirrors; thereby reducing the scattering effect on the laser, and increasing the S/N ratio.

The present invention is implemented on silicon. A $SiO_2$ layer is first coated on the surfaces of micromirrors after forming the micromirrors by etching the silicon. Then, a $CO_2$ laser with a wavelength of 10.6 μm is applied to illuminate the silicon substrate. The silicon substrate is transparent to the 10.6 μm $CO_2$ laser. That is the silicon substrate will not absorb the $CO_2$ laser light. On the contrary, $SiO_2$ is opaque to a 10.6 μm $CO_2$ laser. Therefore, a 10.6 μm $CO_2$ laser can be utilized to perform annealing for $SiO_2$ to improve the surface flatness. In this way, the roughness can be controlled under $\lambda/4$.

Another implementation of this invention is to coat a layer of gold on the silicon to form a eutectic structure, which is then heated to increase the surface flatness.

After the flatness of the micro-mirror's surface has been improved, a layer of gold is coated to increase the reflectance of the micro-mirror.

BRIEF DESCRIPTION OF THE DRAWINGS

The following detailed description, given by way of example and not intended to limit the invention solely to the embodiments described herein, will be best understood in conjunction with the accompanying drawings in which.

In all of the figures, identical reference numbers represent the same or similar components of the apparatus utilized for the description of the present invention.

DETAILED DESCRIPTION OF THE PREFERRED EMBODIMENTS

The fabrication process of the present invention makes use of the following phenomena. The energy gap of silicon is about 1.1 eV. In other words, the light that has a wavelength shorter than 1.1 μm can be absorbed by silicon. Furthermore, silicon does not absorb 10.6-μm light and is "transparent" for an incident light having a wavelength of 10.6 μm. However, $SiO_2$ absorbs 10.6 μm light. Therefore, using a 10.6-μm light can process $SiO_2$ without having any influence on the silicon substrate.

Silicon is utilized as a substrate for being etched and forming micro-mirrors. Because of the impurities remained on the silicon substrate, it is difficult to achieve a flatness of under $\lambda/4$ on the micro-mirrors through physical etching or chemical etching along the silicon surface by using KOH. However, after forming a $SiO_2$ layer on the silicon substrate, a flatness of about $\lambda$ is provided on the micro-mirrors. The flatness can be further improved if a localized heating process is applied to anneal the $SiO_2$ layer.

Before implementing the fabrication process of this invention, all of the specifications and parameters of an optical system have to be designed and determined by ray tracing.

Figure 1:
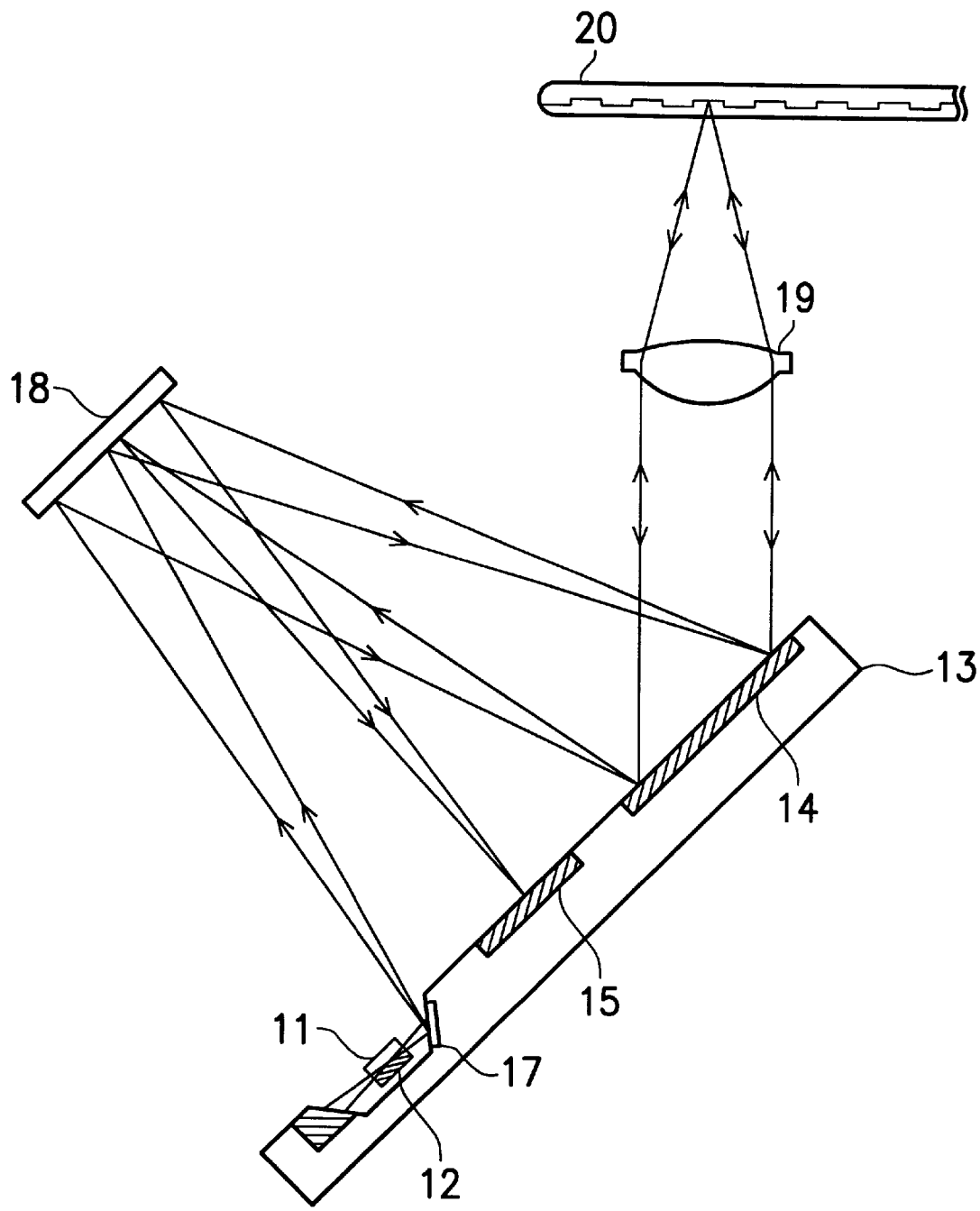
FIG. 1 is a diagram illustrating a conventional optical pick-up head including micromirrors.
Figure 2A:
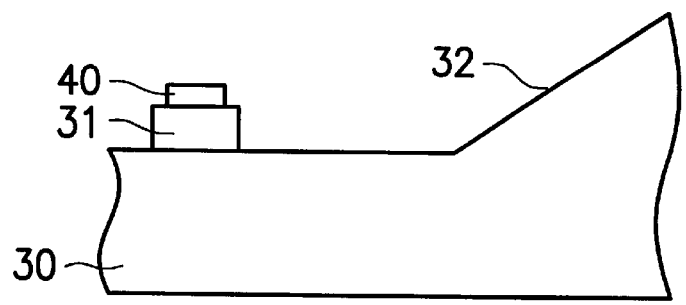
FIGS. 2a to 2d are diagrams illustrating the fabrication process of micromirrors on a silicon substrate according to one embodiment of this invention.

The first embodiment describes the fabrication process of micro-mirrors on a silicon-based optical pick-up head apparatus. Referring to FIG. 2a, a silicon substrate 30 is etched to form micro-planes 32 by a wet etching step using KOH or a dry etching step such as RIE. Laser diode 40 is first formed on a semiconductor substrate 31, which is then adhered by using flip-chip or wire bonding methods on the silicon substrate 30.

Figure 2B:
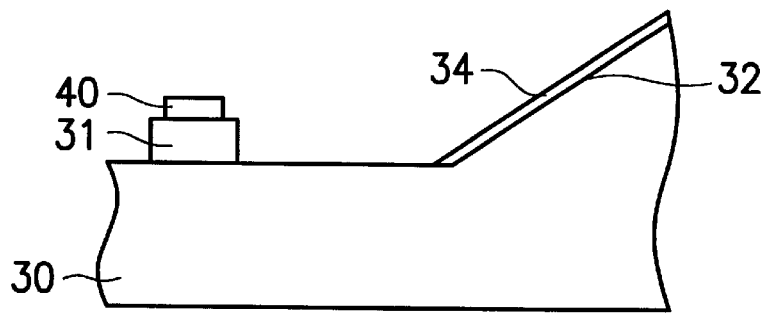

The thickness of $SiO_2$ to be coated has to be determined in advance after measuring the flatness of the micro-mirrors 32. Referring to FIG. 2b, a $SiO_2$ layer 34 is then formed on the micro-planes 32 by chemical vapor deposition (CVD), plasma-enhanced chemical vapor deposition (PECVD), or sputtering.

Figure 2C:
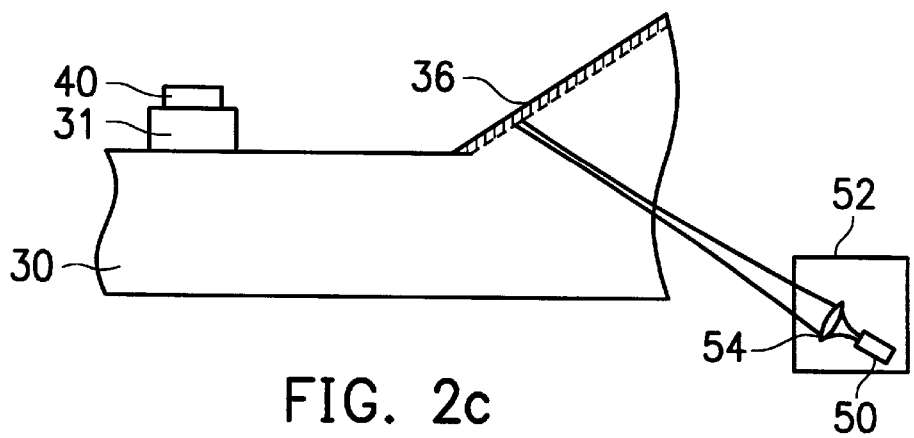

Referring FIG. 2c, a $CO_2$ laser 50 is mounted on a movable platform 52, so that the laser beam can move on a plane. A lens 54 is placed in front of the $CO_2$ laser 50 to adjust the area of the heating region and the power density of the laser. The laser beam is focused on the $SiO_2$ layer 34 after passing through the silicon substrate 30. The $SiO_2$ layer 34 is melted by localized heating by the $CO_2$ laser and then crystallized again to form flat micro-mirrors 36 if the power density of the laser is less than 10000 W/cm$^2$ and the moving velocity of the laser beam is about 100~0.1 mm/sec. The micro-mirrors 36 so formed can be expected to have a flatness of $\lambda/4$.

Figure 2D:
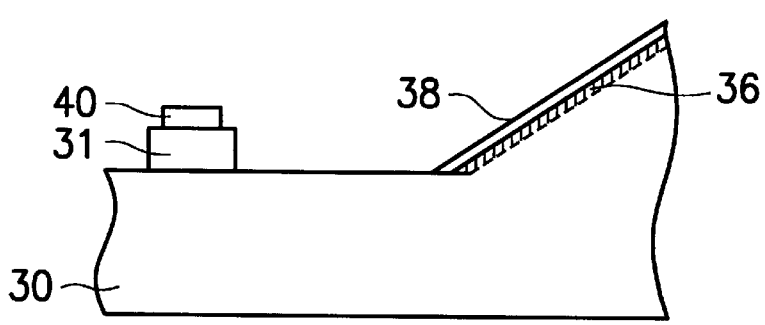

Referring to FIG. 2d, a layer of Au 38 is then coated on the micro-mirrors 36 to increase the reflectance of the micro-mirrors 36.

The present invention provides a simple process of fabricating micro-mirrors with high precision. By annealing the $SiO_2$ layer the flatness of the micro-mirrors is markedly improved. While the power density is less than 10000 $W/cm^2$ and the moving velocity of the laser beam is about 100~0.1 mm/sec, the micro-mirrors may have a flatness of about $\lambda/4$, which meets the basic requirements for optics. Furthermore, in order to perform localized heating, a $CO_2$ laser with a wavelength of 10.6 $\mu$m is used. Since 10.6-$\mu$m laser beam will not be absorbed by the silicon substrate, it will not damage the opto-electronic components adhering to the silicon substrate.

Regarding to the second embodiment of this invention, before implementing the fabrication process, all of the specifications and parameters of an optical system also have to be designed and determined by ray tracing.

Figure 3A:
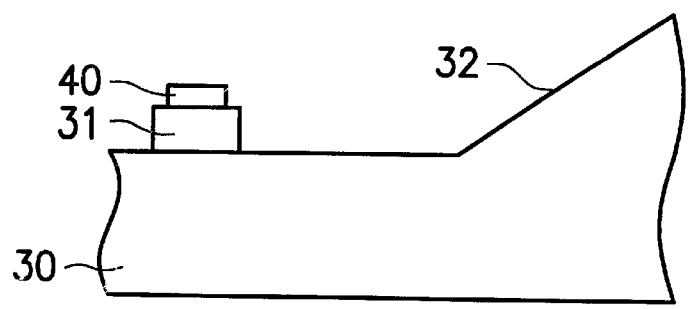
FIGS. 3a to 3d are diagrams illustrating the fabrication process of micromirrors on a silicon substrate according to another embodiment of this invention.

The second embodiment describes a different process of fabricating micro-mirrors on a silicon-based optical pick-up head apparatus. Referring to FIG. 3a, a silicon substrate 30 is etched to form micro-planes 32 by a wet etching step using KOH or a dry etching step such as RIE. Laser diode 40 is first formed on a semiconductor substrate 31, which is then adhered to the silicon substrate 30.

Figure 3B:
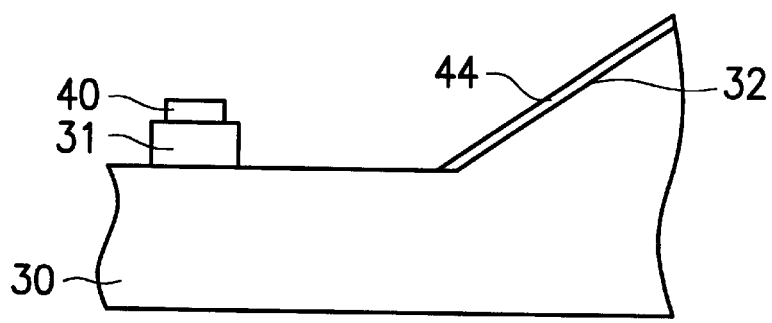

Referring to FIG. 3b, a metal layer 44 is then formed on the micro-planes 32 by ion beam assist deposition, thermal evaporation, electron gun deposition, plasma-enhanced chemical vapor deposition (PECVD) or sputtering. The metal layer 44 can be made of Au, Al, or the like which can be forming eutectic with silicon substrates.

Figure 3C:
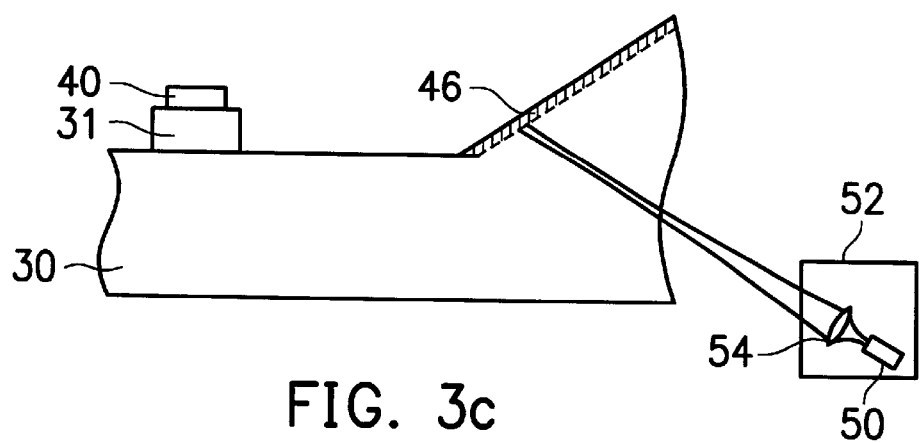
Figure 3D:
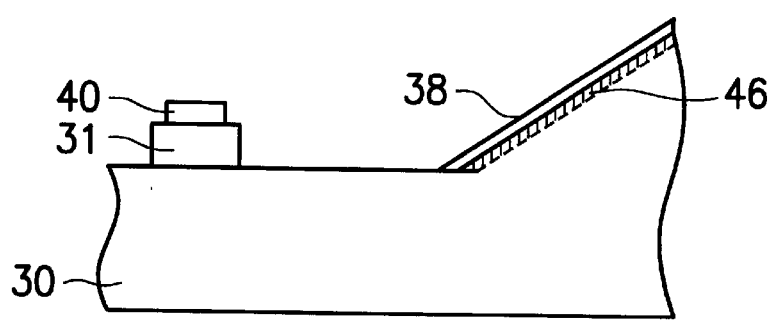

Referring FIG. 3c, a $CO_2$ laser 50 is mounted on a movable platform 52, so that the laser beam can move on a plane. A lens 54 is placed in front of the $CO_2$ laser 50 to adjust the area of the heating region and the power density of the laser. The laser beam is focused on the interface between the metal layer 44 and the silicon substrate 30 after passing through the silicon substrate 30. While the interface is heated to eutectic temperature, the interface between metal layer 44 and the silicon substrate 30 is melted, and thereafter to form a more flat surface after recrystallizing from a eutectic state, finally a micro-mirrors 46 structure was formed. The micro-mirrors 46 so formed are expected to have a flatness of $\lambda/4$. Furthermore, Au is a preferred material for forming a eutectic structure with silicon since it has a relatively low melting point. The certain temperature mentioned above is 370° C. for Au.

Referring to FIG. 2d, a layer of Au 38 is then coated on the micro-mirrors 46 to increase the reflectance of the micro-mirrors 46.

In the above embodiments, the source employed to heat the SiO2 layer or the metal layer and the substrate is a laser beam. However, if the other components on the substrate are not affected by any kind of heating process, then the semiconductor substrate can be directly heated in a furnace.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiments, those alternatives, which have been discussed above, and all equivalents thereto.

What is claimed is:

1. A process for fabricating micro-mirrors on a silicon substrate comprising the steps of:
    (i) forming micro-planes along a certain orientation of a crystalline plane on a silicon substrate to serve as mirrors;
    (ii) forming a $SiO_2$ layer on the silicon substrate;
    (iii) melting said $SiO_2$ layer on the micro-planes by a heating process, and then crystallizing $SiO_2$ again to form micro-mirrors;
wherein said micro-mirrors are provided with a flatness of within $\lambda/4$ where $\lambda$ is the wavelength of incident light.

2. A fabrication process of micro-mirrors as claimed in claim 1 further comprising the step of coating a layer of Au on the micro-mirrors to increase the reflectance of the micro-mirrors.

3. A fabrication process of micro-mirrors as claimed in claim 1 wherein the micro-planes are formed by wet etching using a KOH solution.

4. A fabrication process of micro-mirrors as claimed in claim 1 wherein the heating process involves directly heating the silicon substrate in a furnace.

5. A process for fabricating micro-mirrors on a silicon substrate comprising the steps of:
    (iv) forming micro-planes along a certain orientation of a crystalline plane on a silicon substrate to serve as mirrors;
    (v) forming a $SiO_2$ layer on the silicon substrate;
    (vi) melting said $SiO_2$ layer on the micro-planes by focusing a laser on an interface of the micro-planes and the $SiO_2$ layer, and then crystallizing $SiO_2$ again to form micro-mirrors.

6. A fabrication process of micro-mirrors as claimed in claim 5 wherein the laser is incident light passing through the silicon substrate that is then focused on the $SiO_2$ layer.

7. A fabrication process of micro-mirrors as claimed in claim 5 wherein the laser is a $CO_2$ laser.

8. A process for fabricating micro-mirrors on a silicon substrate comprising the steps of:
    (i) forming micro-planes along a certain direction on a silicon substrate to serve as mirrors;
    (ii) forming a reflective material on the silicon substrate;
    (iii) melting said reflective material on the micro-planes by a heating process, and then crystallizing said reflective material again to form micro-mirrors;
wherein said micro-mirrors are provided with a flatness of within $\lambda/4$, where $\lambda$ is the wavelength of incident light.

9. A fabrication process of micro-mirrors as claimed in claim 8 further comprising the step of coating a layer of Au on the micro-mirrors to increase the reflectance of the micro-mirrors.

10. A fabrication process of micro-mirrors as claimed in claim 8 wherein the micro-planes are formed by wet etching using a KOH solution.

11. A fabrication process of micro-mirrors as claimed in claim 8 wherein the heating process involves directly heating the silicon substrate in a furnace.

12. A fabrication process of micro-mirrors as claimed in claim 8 wherein the reflective material is $SiO_2$.

13. A fabrication process of micro-mirrors as claimed in claim 8 wherein the reflective material is metal.

14. A fabrication process of micro-mirrors as claimed in claim 13 wherein the metal is Au.

15. A process for fabricating micro-mirrors on a silicon substrate comprising the steps of:
    (i) forming micro-planes along a certain orientation of a crystalline plane on a silicon substrate to serve as mirrors;
    (ii) forming a material serving as a smooth over layer on the silicon substrate;
    (iii) melting said smooth over layer on the micro-planes by focusing a laser on an interface of the micro-planes and the smooth over layer, and then crystallizing said smooth over layer again to form micro-mirrors.

16. A fabrication process of micro-mirrors as claimed in claim 15 wherein the laser is incident light passing through the silicon substrate that is then focused on said smooth over layer.

17. A fabrication process of micro-mirrors as claimed in claim 15 wherein the laser is a $CO_2$ laser.

18. A fabrication process of micro-mirrors as claimed in claim 15 further comprising the step of coating a layer of metal having a high reflectivity on the micro-mirrors to increase the reflectance of the micro-mirrors.

19. A fabrication process of micro-mirrors as claimed in claim 18 wherein the metal is Au or Al.

20. A fabrication process of micro-mirrors as claimed in claim 15 wherein the micro-planes are formed by wet etching using a KOH solution.

21. A fabrication process of micro-mirrors as claimed in claim 15 wherein said micro-mirrors are provided with a flatness of within $\lambda/4$, where $\lambda$ is the wavelength of incident light.

* * * * *